E. O. SCHULTZE.
TRACTOR CONTROLLING MEANS.
APPLICATION FILED DEC. 22, 1919.
1,366,287.
Patented Jan. 18, 1921.
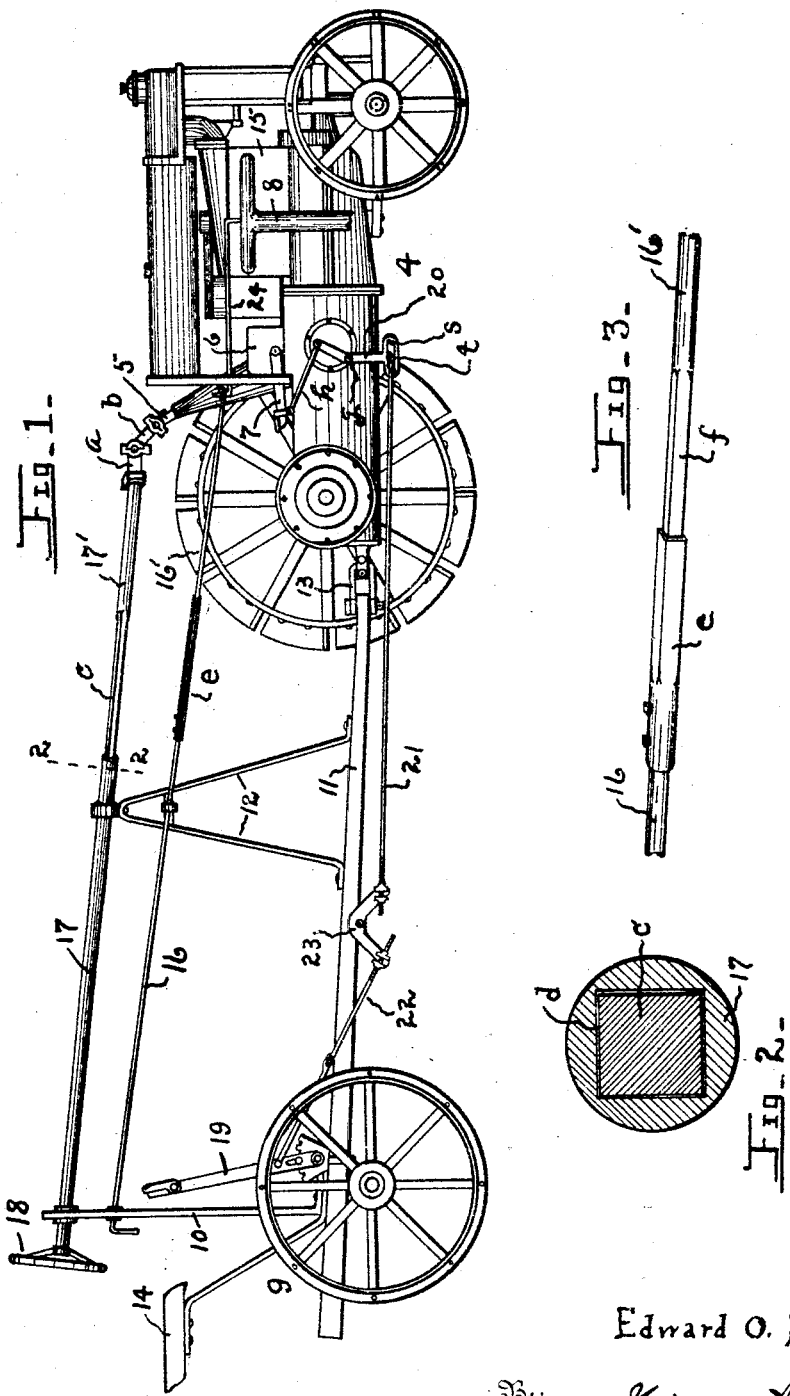
Inventor
Edward O. Schultze,
By Hiram A. Sturges,
Attorney

UNITED STATES PATENT OFFICE.

EDWARD O. SCHULTZE, OF STAPLEHURST, NEBRASKA.

TRACTOR-CONTROLLING MEANS.

1,366,287.   Specification of Letters Patent.   Patented Jan. 18, 1921.

Application filed December 22, 1919. Serial No. 346,598.

*To all whom it may concern:*

Be it known that I, EDWARD O. SCHULTZE, a citizen of the United States, residing at Staplehurst, in the county of Seward and State of Nebraska, have invented certain new and useful Improvements in Tractor-Controlling Means, of which the following is a specification.

This invention relates to means for steering and for the control of the start-and-stop mechanism and speed of a tractor, said control to be directed by an operator from a vehicle or machine drawn by the tractor; and has for its objects, broadly, to permit an individual control both for the drawn machine and tractor and to dispense with at least one operator or driver heretofore required for the tractor, the parts employed for this purpose to be few and simple so that they will be durable and may be produced at a reasonable cost, and will be convenient in use.

The invention consists of the novel construction, combination and arrangement of parts as described herein and claimed, and as illustrated in the accompanying drawing, wherein,—

Figure 1 is a view in side elevation of a tractor and a drawn vehicle, one of the wheels of the tractor being removed. Figs. 2 and 3 are detail views. Fig. 2 is a view on an enlarged scale on line 2—2 of Fig. 1. Fig. 3 is a broken away detail showing a part of a tubular, revoluble control-rod splined on a rod-section.

Referring now to the drawing for a more particular description, the invention is shown and described in connection with a tractor 4 and its steering-post 5, a clutch-housing and a clutch control-lever being respectively indicated at 6 and 7, and an intake manifold for the engine being indicated at 8.

At 9 is indicated a vehicle provided with a standard 10 and having a tongue 11 provided with a standard 12 and adapted to be secured to the rear end of the tractor by a coupling-member 13.

It will be understood that one of the objects of the invention is to provide means which will be operative regardless of the rocking movements of the tractor so that a full control of the tractor will be possible by an operator while occupying the seat 14 of the vehicle 9, to dispense with the conventional driver or operator for the tractor.

I provide means for a start-and-stop for the engine 15 of the tractor consisting of a tubular, revoluble rod 16 which communicates with the carbureter (not shown), said rod being supported by the standards 10 and 12, and I provide means for steering the tractor consisting of a tubular bar 17 supported by said standards and provided at its rear end with a steering wheel 18, an arrangement of pivotally connected sections *a* and *b* being provided for connecting the bar-section 17', which has a part *c* formed angular in cross-section, with the bar 17, said part *c* engaging in the aperture *d* (Fig. 2.) of the tubular bar 17, and it will be understood that the steering post 5 may be rotated by manually rotating the wheel 18, the splined connection shown permitting said part *c* to have a slidable movement in the aperture *d* of the tubular bar 17, this sliding movement being required while driving over rough ground; and for this reason the rod 16 is provided with a tubular part *e* having an aperture angular in cross-section for receiving the terminal *f* (Fig. 3.) of a rod-section 16', whereby a revoluble movement of the rod 16 will cause a revoluble movement of the rod 16' for a control of the carbureter, a link 24 being employed for connecting the rod-section 16' with the carbureter.

The clutch control-lever 7 is movable for controlling the speed, or terminating the movement of the tractor by means of a hand-lever 19 under control of the operator, a rock-lever 20 being mounted upon the tractor, as indicated at *g*, the outer end of the clutch control-lever 7 being pivotally connected with the rock-lever by the link *h*; links 21 and 22 being provided, having their inner ends connected with a bell-crank 23 for convenience in operation, said bell-crank being mounted upon the tongue, and the link 21 engaging in a slot *s* provided in the end of the rock-lever, said slot being disposed at approximately right-angles to the arm of said lever.

The means herein shown are adapted to be employed to great advantage in the operations of mowing, reaping or plowing, the tongue of the machine or vehicle, in all instances being connected to the rear end of the tractor, only one driver being required, who, while riding on the rear vehicle, steers and otherwise controls the tractor, the members *c* and *f*, respectively, having sliding movements in members 17 and e, and the terminal t of the link 21 moving in the slot s of the rock-lever when the tractor moves across ditches or other depressions.

It will be understood that any kind of a machine may be substituted for the element 9, a tongue being provided therefor so that it may be drawn by the tractor, since operation would be the same. While I have shown and described construction in detail, I do not wish to be understood as limiting myself in this respect, and changes in form, size, proportion, and minor details may be made as found to be of advantage, said changes to be determined by the scope of the invention as claimed.

I claim:

1. In apparatus for the purpose set forth, the combination with an engine-driven tractor having a clutch-control lever, of a rock lever mounted on the tractor and operatively connected at one end with the clutch-control lever and provided at its opposite end with a slot, a vehicle having its tongue coupled to the tractor, a bell-crank pivoted on the tongue of the vehicle, a link pivoted at its rear end to one arm of the bell crank and having its front end playing in the slot in the rock lever, an operating lever on the vehicle, and link connections between said lever and the bell-crank.

2. In apparatus for the purpose set forth, the combination with an engine-driven tractor having a clutch-control lever, of a rock lever mounted on the tractor and operatively connected at one end with the clutch-control lever and provided at its opposite end with a slot, a vehicle having its tongue coupled to the tractor, a bell-crank pivoted on the tongue of the vehicle, a link pivoted at its rear end to one arm of the bell crank and having its front end playing in the slot in the rock lever, an operating lever on the vehicle, link connections between said lever and the bell-crank, a steering post on the tractor, a carbureter control on the tractor, spaced standards erected on the tongue of the vehicle, and telescopic controlling devices mounted on said standards and operable from the vehicle and connected respectively to the carbureter control and the steering post.

In testimony whereof I have affixed my signature in presence of two witnesses.

EDWARD O. SCHULTZE.

Witnesses:
EDWARD MOORE,
G. A. SWANSON.